(12) United States Patent
Rodriguez

(10) Patent No.: US 11,641,708 B2
(45) Date of Patent: May 2, 2023

(54) LIGHT FIXTURE CONTROLLABLE VIA DUAL NETWORKS

(71) Applicant: ABL IP Holding LLC, Atlanta, GA (US)

(72) Inventor: Yan Rodriguez, Suwanee, GA (US)

(73) Assignee: ABL IP HOLDING LLC, Atlanta, GA (US)

( * ) Notice: Subject to any disclaimer, the term of this patent is extended or adjusted under 35 U.S.C. 154(b) by 22 days.

(21) Appl. No.: 17/412,876

(22) Filed: Aug. 26, 2021

(65) Prior Publication Data

US 2022/0070989 A1 Mar. 3, 2022

Related U.S. Application Data

(60) Provisional application No. 63/071,432, filed on Aug. 28, 2020.

(51) Int. Cl.
*H05B 47/19* (2020.01)
*H04W 48/18* (2009.01)
(Continued)

(52) U.S. Cl.
CPC ......... *H05B 47/19* (2020.01); *H04L 12/2816* (2013.01); *H04W 4/80* (2018.02); *H04W 48/18* (2013.01)

(58) Field of Classification Search
CPC ........... H04W 4/38; H04W 4/70; H04W 4/80; H04W 48/18; H04W 84/18; H04W 4/35;
(Continued)

(56) References Cited

U.S. PATENT DOCUMENTS 6,201,351 B1 3/2001 Rudolph et al.
6,323,598 B1 11/2001 Guthrie et al.
(Continued)

FOREIGN PATENT DOCUMENTS

CN 106555981 4/2017
EP 2768283 8/2014
(Continued)

OTHER PUBLICATIONS

Application No. CA 3,096,225, Office Action, dated Nov. 23, 2021, 3 pages.
(Continued)

*Primary Examiner* — Monica C King
(74) *Attorney, Agent, or Firm* — Kilpatrick Townsend & Stockton LLP

(57) ABSTRACT

An example control system includes a set of light fixtures connected to a hub, where each light fixture includes a hub-communication device configured to communicate with the hub and a direct communication device configured to communicate directly with other light fixtures. Together, the light fixtures form a mesh network facilitated by the use of their direct communication devices. An external device communicates an instruction to a light fixture, and the instruction is propagated throughout the mesh network through communications among the light fixtures using their respective direct communication devices. As a result, each light fixture to which the instruction applies receives and complies with the instructions. The light fixtures are also configured to receive instructions from the hub, such that a light fixture is configured to receive instructions over dual networks.

20 Claims, 2 Drawing Sheets

(51) Int. Cl.
*H04L 12/28* (2006.01)
*H04W 4/80* (2018.01)

(58) Field of Classification Search
CPC ....... H04W 84/10; H04W 76/10; H04W 4/18; H04W 84/12; H04W 76/15; H04W 12/06; H04W 12/04; H04W 24/02; H04W 4/12; H04W 88/06; H04W 88/16; H04W 92/02; H04W 12/009; H04W 12/033; H04W 12/041; H04W 12/069; H04W 12/08; H04W 12/088; H04W 12/10; H04W 12/106; H04W 12/108; H04W 12/35; H04W 12/37; H04W 12/50; H04W 12/65; H04W 12/77; H04W 4/00; H04W 4/02; H04W 4/025; H04W 4/029; H04W 4/40; H04W 40/32; H04W 72/048; H04W 8/005; H04W 84/20; H04W 52/0209; H04W 52/16; H04W 52/246; H04W 52/362; H05B 47/19; H05B 39/086; H05B 39/088; H05B 47/115; H05B 45/10; H05B 45/22; H05B 47/105; H05B 47/22; F21S 2/00; F21S 8/086; H04L 61/5007

See application file for complete search history.

(56) References Cited

U.S. PATENT DOCUMENTS

| | | |
|---|---|---|
| 6,995,355 B2 | 2/2006 | Rains, Jr. et al. |
| 7,014,336 B1 | 3/2006 | Ducharme et al. |
| 7,088,059 B2 | 8/2006 | McKinney et al. |
| 7,135,664 B2 | 11/2006 | Vornsand et al. |
| 7,173,383 B2 | 2/2007 | Vornsand et al. |
| 7,329,998 B2 | 2/2008 | Jungwirth |
| 7,416,312 B1 | 8/2008 | McDermott |
| 7,423,387 B2 | 9/2008 | Robinson et al. |
| 7,497,590 B2 | 3/2009 | Rains, Jr. et al. |
| 7,520,634 B2 | 4/2009 | Ducharme et al. |
| 7,883,239 B2 | 2/2011 | Rains, Jr. et al. |
| 8,172,415 B2 | 5/2012 | Wegh et al. |
| 8,203,260 B2 | 6/2012 | Li et al. |
| 8,228,002 B2 | 7/2012 | Newman, Jr. et al. |
| RE43,606 E | 8/2012 | Bruwer |
| 8,317,362 B2 | 11/2012 | Ku et al. |
| 8,373,362 B2 | 2/2013 | Chemel et al. |
| 8,436,549 B2 | 5/2013 | Hasnain |
| 8,598,809 B2 | 12/2013 | Negley et al. |
| 8,633,650 B2 | 1/2014 | Sauerlaender |
| 8,638,045 B2 | 1/2014 | Kunst et al. |
| 8,669,722 B2 | 3/2014 | Yeh et al. |
| 8,710,754 B2 | 4/2014 | Baddela et al. |
| 8,791,642 B2 | 7/2014 | van de Ven et al. |
| 8,823,289 B2 | 9/2014 | Linz et al. |
| 8,872,438 B2 | 10/2014 | Zhou et al. |
| 8,878,443 B2 | 11/2014 | Luo et al. |
| 8,890,419 B2 | 11/2014 | Stack |
| 8,890,436 B2 | 11/2014 | Chou |
| 8,914,312 B2 | 12/2014 | McLaughlin et al. |
| 8,941,312 B2 | 1/2015 | McRae |
| 8,975,823 B2 | 3/2015 | Yang et al. |
| 9,055,647 B2 | 6/2015 | Sutardja et al. |
| 9,072,149 B2 | 6/2015 | Wu et al. |
| 9,125,271 B2 | 9/2015 | Martins et al. |
| 9,144,131 B2 | 9/2015 | Wray |
| 9,210,760 B2 | 12/2015 | Sanders et al. |
| 9,277,607 B2 | 3/2016 | Ramer et al. |
| 9,289,269 B2 | 3/2016 | Valteau et al. |
| 9,301,359 B2 | 3/2016 | Wray |
| 9,374,876 B2 | 6/2016 | Alpert et al. |
| 9,386,653 B2 | 7/2016 | Kuo et al. |
| 9,414,457 B2 | 8/2016 | Fukuda et al. |
| 9,485,826 B2 | 11/2016 | Bohler et al. |
| 9,538,603 B2 | 1/2017 | Shearer et al. |
| 9,538,604 B2 | 1/2017 | Yadav et al. |
| 9,544,951 B1 | 1/2017 | O'Neil et al. |
| 9,544,969 B2 | 1/2017 | Baddela et al. |
| 9,554,441 B2 | 1/2017 | Sutardja et al. |
| 9,560,710 B2 | 1/2017 | Beijer et al. |
| 9,603,213 B1 | 3/2017 | Suttles et al. |
| 9,665,262 B2 | 5/2017 | Hole |
| 9,719,642 B1 | 8/2017 | Macias |
| 9,730,291 B1 | 8/2017 | Janik et al. |
| 9,801,250 B1 | 10/2017 | Halliwell |
| 9,820,350 B2 | 11/2017 | Pyshos et al. |
| 9,892,693 B1 | 2/2018 | Kumar et al. |
| 9,900,945 B1 | 2/2018 | Janik et al. |
| 10,091,855 B2 | 10/2018 | Van Winkle |
| 10,117,300 B2 | 10/2018 | Doheny et al. |
| 10,163,405 B2 | 12/2018 | Kumar et al. |
| 10,290,265 B2 | 5/2019 | Kumar et al. |
| 10,292,233 B1 | 5/2019 | Udavant et al. |
| 10,299,335 B2 | 5/2019 | Pyshos et al. |
| 10,299,336 B2 | 5/2019 | Bowen et al. |
| 10,299,337 B1 | 5/2019 | Chen et al. |
| 10,448,471 B1 | 10/2019 | Chowdhury et al. |
| 10,575,380 B2 | 2/2020 | Udavant et al. |
| 10,660,174 B2 | 5/2020 | Huang et al. |
| 10,674,579 B2 | 6/2020 | Bruckner et al. |
| 10,681,784 B2 | 6/2020 | Bruckner et al. |
| 10,856,384 B2 | 12/2020 | Chen et al. |
| 10,874,006 B1 | 12/2020 | Davis et al. |
| 10,904,970 B2 | 1/2021 | Udavant et al. |
| 10,952,292 B2 | 3/2021 | Chowdhury et al. |
| 10,966,306 B1 | 3/2021 | Recker et al. |
| 2005/0162851 A1 | 7/2005 | Kazar et al. |
| 2005/0243022 A1 | 11/2005 | Negru |
| 2006/0220586 A1 | 10/2006 | Latham |
| 2006/0226795 A1 | 10/2006 | Walter et al. |
| 2006/0238136 A1 | 10/2006 | Johnson, III et al. |
| 2006/0285310 A1 | 12/2006 | Shyu |
| 2007/0159750 A1 | 7/2007 | Peker et al. |
| 2007/0262724 A1 | 11/2007 | Mednik et al. |
| 2008/0130298 A1 | 6/2008 | Negley et al. |
| 2009/0026913 A1 | 1/2009 | Mrakovich |
| 2009/0218960 A1 | 9/2009 | Lyons et al. |
| 2009/0256483 A1 | 10/2009 | Gehman et al. |
| 2010/0097406 A1 | 4/2010 | Zulch |
| 2010/0141175 A1 | 6/2010 | Hasnain et al. |
| 2010/0171633 A1 | 7/2010 | Baker et al. |
| 2010/0207534 A1 | 8/2010 | Dowling et al. |
| 2010/0214764 A1 | 8/2010 | Chaves et al. |
| 2010/0283322 A1 | 11/2010 | Wibben |
| 2010/0308738 A1 | 12/2010 | Shteynberg et al. |
| 2011/0058372 A1 | 3/2011 | Lerman et al. |
| 2011/0062872 A1 | 3/2011 | Jin et al. |
| 2011/0068702 A1 | 3/2011 | van de Ven et al. |
| 2011/0084615 A1 | 4/2011 | Welten |
| 2011/0115407 A1 | 5/2011 | Wibben et al. |
| 2011/0210678 A1 | 9/2011 | Grajcar |
| 2011/0273495 A1 | 11/2011 | Ward et al. |
| 2011/0316441 A1 | 12/2011 | Huynh |
| 2012/0080944 A1 | 4/2012 | Recker et al. |
| 2012/0081005 A1 | 4/2012 | Lin et al. |
| 2012/0081009 A1 | 4/2012 | Shteynberg et al. |
| 2012/0098460 A1 | 4/2012 | Miyasaka et al. |
| 2012/0242247 A1 | 9/2012 | Hartmann et al. |
| 2012/0253542 A1 | 10/2012 | Nurmi et al. |
| 2012/0286753 A1 | 11/2012 | Zhong et al. |
| 2013/0002167 A1 | 1/2013 | Van de Ven |
| 2013/0021580 A1 | 1/2013 | Morgan et al. |
| 2013/0038222 A1 | 2/2013 | Yeh et al. |
| 2013/0043795 A1 | 2/2013 | Burayez et al. |
| 2013/0049610 A1 | 2/2013 | Chen |
| 2013/0082616 A1 | 4/2013 | Bradford et al. |
| 2013/0140988 A1 | 6/2013 | Maxik et al. |
| 2013/0141013 A1 | 6/2013 | Kodama et al. |
| 2013/0169158 A1 | 7/2013 | He et al. |
| 2013/0200806 A1 | 8/2013 | Chobot |
| 2013/0229125 A1 | 9/2013 | Yan et al. |
| 2013/0249422 A1 | 9/2013 | Kerstens et al. |
| 2013/0249440 A1 | 9/2013 | Doshi et al. |
| 2013/0343052 A1 | 12/2013 | Yen |

(56) References Cited

U.S. PATENT DOCUMENTS

| | | |
|---|---|---|
| 2014/0001959 A1 | 1/2014 | Motley et al. |
| 2014/0035472 A1 | 2/2014 | Raj et al. |
| 2014/0042920 A1 | 2/2014 | Chou |
| 2014/0184076 A1 | 7/2014 | Murphy |
| 2014/0197750 A1 | 7/2014 | Cash |
| 2014/0210357 A1 | 7/2014 | Yan et al. |
| 2014/0210364 A1 | 7/2014 | Cash et al. |
| 2014/0252967 A1 | 9/2014 | van de Ven et al. |
| 2014/0312777 A1 | 10/2014 | Shearer et al. |
| 2015/0009666 A1 | 1/2015 | Keng et al. |
| 2015/0097489 A1 | 4/2015 | Wu et al. |
| 2015/0245441 A1 | 8/2015 | McCune, Jr. |
| 2015/0256760 A1 | 9/2015 | Ju et al. |
| 2015/0351169 A1 | 12/2015 | Pope et al. |
| 2015/0359061 A1 | 12/2015 | Adler |
| 2016/0007420 A1 | 1/2016 | Gong et al. |
| 2016/0098950 A1 | 4/2016 | Nicholson |
| 2016/0128155 A1 | 5/2016 | Petluri et al. |
| 2016/0323949 A1 | 11/2016 | Lee |
| 2016/0352975 A1 | 12/2016 | Kervec et al. |
| 2016/0363308 A1 | 12/2016 | Shum |
| 2016/0366746 A1 | 12/2016 | van de Ven et al. |
| 2016/0366751 A1 | 12/2016 | Xu et al. |
| 2016/0374177 A1 | 12/2016 | Chen |
| 2017/0019973 A1 | 1/2017 | Beck et al. |
| 2017/0027033 A1 | 1/2017 | Chobot et al. |
| 2017/0086265 A1 | 3/2017 | Akiyama et al. |
| 2017/0086280 A1 | 3/2017 | Boomgaarden et al. |
| 2017/0105129 A1* | 4/2017 | Teplin .................. H04W 24/02 |
| 2017/0135186 A1 | 5/2017 | O'Neil et al. |
| 2017/0164440 A1 | 6/2017 | Hu et al. |
| 2017/0238392 A1 | 8/2017 | Shearer et al. |
| 2017/0303363 A1 | 10/2017 | Pyshos et al. |
| 2017/0354013 A1 | 12/2017 | DeMayo et al. |
| 2018/0035510 A1 | 2/2018 | Doheny et al. |
| 2018/0103523 A1 | 4/2018 | Yan et al. |
| 2018/0116029 A1 | 4/2018 | Pyshos et al. |
| 2018/0166026 A1 | 6/2018 | Kumar et al. |
| 2018/0242422 A1 | 8/2018 | Choi et al. |
| 2018/0249547 A1 | 8/2018 | Wang et al. |
| 2018/0310381 A1 | 10/2018 | Bowen et al. |
| 2018/0368218 A1 | 12/2018 | Petluri et al. |
| 2018/0368232 A1 | 12/2018 | Doheny et al. |
| 2019/0027099 A1 | 1/2019 | Kumar et al. |
| 2019/0037663 A1 | 1/2019 | Van Winkle |
| 2019/0088213 A1 | 3/2019 | Kumar et al. |
| 2019/0090327 A1 | 3/2019 | Zolotykh et al. |
| 2019/0141812 A1 | 5/2019 | Chen |
| 2019/0191512 A1 | 6/2019 | Zeng et al. |
| 2019/0268984 A1 | 8/2019 | Song et al. |
| 2019/0268991 A1 | 8/2019 | Li |
| 2019/0338895 A1 | 11/2019 | Jeswani et al. |
| 2019/0394851 A1 | 12/2019 | Sinphay |
| 2020/0380563 A1* | 12/2020 | Shiffert ................. H04W 4/023 |
| 2020/0389469 A1* | 12/2020 | Litichever ............. H04L 63/029 |
| 2021/0282248 A1 | 9/2021 | Magielse et al. |
| 2022/0046757 A1* | 2/2022 | Sanders ................. H04L 43/10 |

FOREIGN PATENT DOCUMENTS

| | | |
|---|---|---|
| EP | 2728972 | 8/2015 |
| JP | 2011258517 | 12/2011 |
| WO | 2011084135 | 7/2011 |

OTHER PUBLICATIONS

2×4 LED Flat PanelCybertech, Main Place Lighting, Available Online at: https://shopmainplacelighting.com/collections/commercial-lighting/products/2-x-4-led-flat-panel-1, Accessed from Internet on May 14, 2019, 3 pages.

3 Inch WarmDim/Tunable WhiteAculux, Accessed from Internet on May 15, 2020, 3 pages.

38W LED Panel—Color SelectableVenture Lighting, Accessed from Internet on May 14, 2019, 6 pages.

Easy Lighting Control Application Guide, OSRAM, Available Online at: www.osram.com/easy, Apr. 2015, 25 pages.

Human Centric LightingHelvar, Intelligent Colour Product Series, Dec. 4, 2017, 4 pages.

IW Cove MX Powercore-Premium Interior Linear LED Cove and Accent Luminaire with Intelligent White LightPhilips Lighting, Product Family Leafelet, Jan. 21, 2019, 3 pages.

LED Panel 1230 40W Colour ChangeableFuzion Lighting, Information sheet, Available online at: http://www.fuzionlighting.com.au/product/led-panel-40-cct, Accessed from Internet on Mar. 19, 2019, 6 pages.

LED Universal Ceiling Fan Light KitHampton Bay, Use and Care Guide, Nov. 7, 2019, 22 pages.

LLP LED Light PanelMain Place Lighting, Specification Sheet, Available Online at: https://cdn.shopify.com/s/files/1/2048/2207/files/LLP-Specification-Sheet-1.pdf, Accessed from Internet on Mar. 19, 2019, 4 pages.

Noble Pro LED Line Voltage Task Lighting NLLP SeriesAFX, Available Online at: www.AFXinc.com, Accessed from Internet at May 13, 2019, 1 page.

Par Lite LedVariWhite, Coemar, User Manual Version 1.0, Jun. 2011, 19 pages.

ViaCon LED-ProductsTrilux Simplify your Light, Available Online at: https://www.trilux.com/en/products/viacon-led/, Accessed from Internet on May 13, 2019, 11 pages.

Warmdim® & Tunable White Adjustable/downlight/wall Wash 1000 Lumen Led 3" Baffle Down Light Trim AX3 WDTW with 3DBAF TrimAculux Luminaire, Mar. 20, 2019, 3 pages.

U.S. Appl. No. 17/091,288, Non-Final Office Action, dated Oct. 31, 2022, 18 pages.

CA 3,129,183, "Office Action," dated Nov. 17, 2022 (4 pages).

* cited by examiner

LIGHT FIXTURE CONTROLLABLE VIA DUAL NETWORKS

CROSS-REFERENCE TO RELATED APPLICATIONS

The present disclosure claims priority to U.S. Provisional Application Ser. No. 63/071,432 for "Light Fixture Controllable Via Dual Networks," filed Aug. 28, 2020, which is incorporated by reference herein in its entirety.

TECHNICAL FIELD

This disclosure relates to light fixtures and, more particularly, to a light fixture controllable via dual networks where one of such networks is facilitated by direct communication among light fixtures.

BACKGROUND

A smart lighting system includes networked light fixtures able to wirelessly receive instructions and to change their configurations (e.g., from a powered-on state to a powered-off state) based on instructions received. To this end, specific hardware is required to facilitate wireless network communication to the light fixtures.

In an example of a smart lighting system, light fixtures are connected to a hub. The hub receives instructions describing how to control the light fixtures, and the hub complies with such instructions by communicating wirelessly with the light fixtures, such as over a ZigBee network. Typically, the hub and the light fixtures have a common manufacturer and are designed to communicate with one another. The hub is typically wired or wirelessly connected to a router, which communicates with a modem, which communicates with a cloud service over the internet. When a user desires to control a light fixture, the user utilizes an external device to transmit an instruction to the cloud service associated with the smart lighting system. The cloud service transmits the instruction to the modem over the internet, and the modem transmits the instruction to the router, which transmits the instruction to the hub, which controls the light fixture.

SUMMARY

An implementation of a control system includes a light fixture and a control application for controlling the light fixture. The light fixture includes a first communication device configured to communicate over a first network using a first communication technique and a second communication device configured to communicate over a second network using a second communication technique. The control application is configured to run on an external device able to communicate over both the first network and the second network. The control application is configured to determine a lighting instruction and to select the first network over the second network for transmitting the lighting instruction to the light fixture. The control application is further configured to transmit the lighting instruction to the light fixture via the first network, based on such selection.

In another implementation, a computer-program product includes a computer-readable storage medium having program instructions embodied thereon. The program instructions are executable by a processor to cause the processor to perform a method. The method includes determining a first lighting instruction. The method further includes detecting a first communication device for transmitting the first lighting instruction to a light fixture over a first network and additionally detecting a peer-to-peer communication device for transmitting the first lighting instruction to the light fixture over a peer-to-peer network. The method further includes selecting the first network over the peer-to-peer network for the first lighting instruction and, based on that selection, using the first communication device to transmit the first lighting instruction to the light fixture over the first network to control the light fixture. The method further includes determining a second lighting instruction and selecting the peer-to-peer network over the first network for the second lighting instruction. Additionally, the method includes using the peer-to-peer communication device to transmit the second lighting instruction to the light fixture over the peer-to-peer network to control the light fixture.

In yet another implementation, a light fixture includes a first communication device, a peer-to-peer communication device, and a processing device. The first communication device is configured to communicate with a smart lighting hub, and the peer-to-peer communication device is configured to communicate directly with each of an external device and a second light fixture. The processing device is configured to receive a first lighting instruction for controlling the light fixture via the first communication device and to modify a setting of the light fixture in accordance with the first lighting instruction. The processing device is further configured to receive a second lighting instruction for controlling the light fixture via the peer-to-peer communication device and to modify the setting of the light fixture in accordance with the second lighting instruction.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
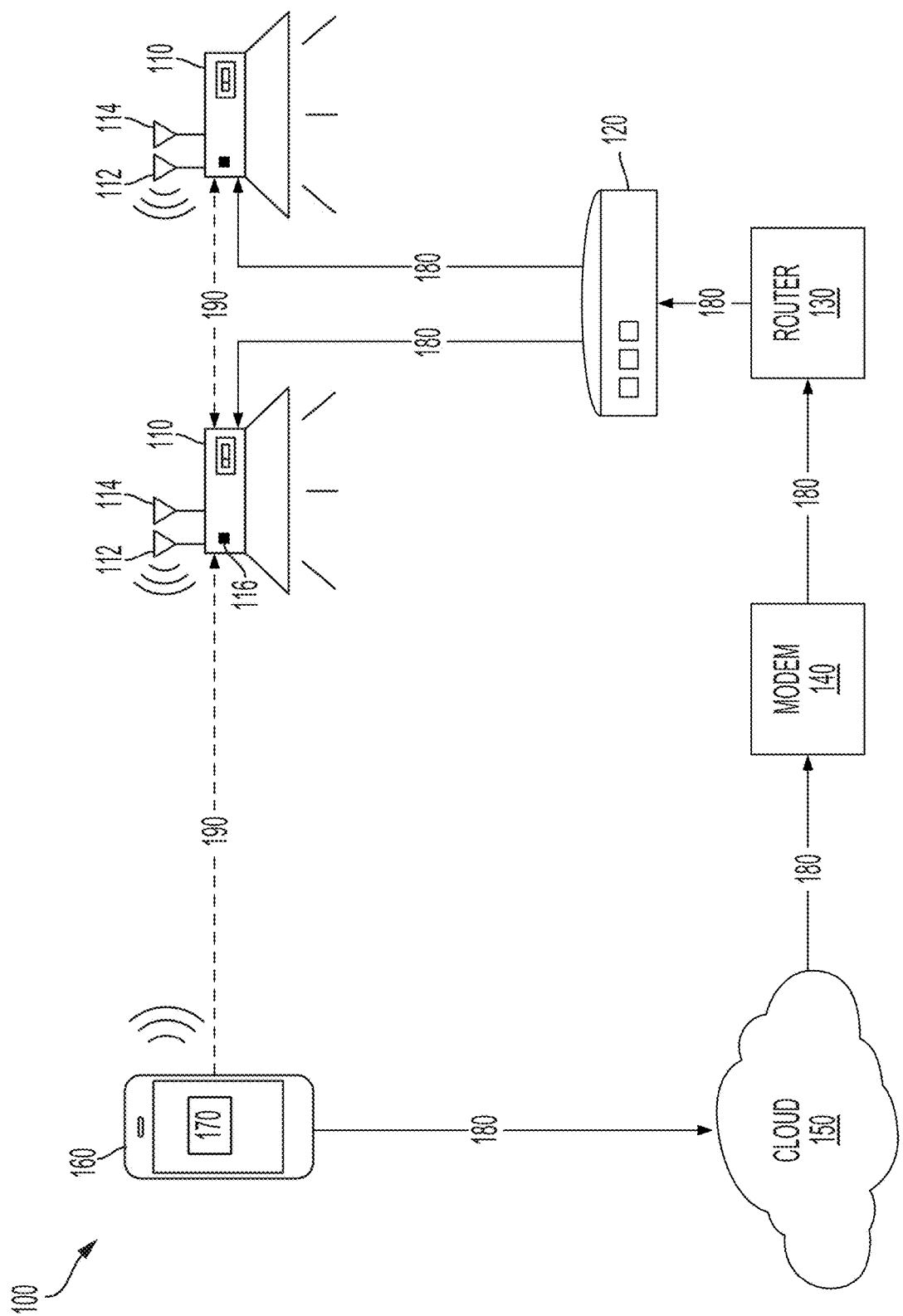
FIG. 1 is a simplified diagram of a control system for controlling a light fixture via dual networks, according to some implementations.

To establish a smart lighting system that includes a hub, a user is required to obtain and install the hub in addition to obtaining and installing individual light fixtures. Without the hub, the light fixtures cannot receive wireless instructions and thus cannot be controlled as part of the smart lighting system. The hub can facilitate an efficient and reliable smart lighting system; however, the hub also represents a cost and complexity increase.

Some implementations of a control system described herein enable a light fixture to be controlled not only by a first network, such as one provided by a hub, but also by an additional network based on a direct communication technique. The direct communication technique is provided, for example, through a peer-to-peer network or a mesh configuration and uses communication technologies such as Bluetooth or Near-Field Communication (NFC). An external device, such as a smartphone, may be able to communicate with a nearby light fixture by way of the direct communication technique, but the external device may be unable to communicate with light fixtures in this manner outside a limited range allowed by the direct communication technique. Thus, in some implementations, the light fixtures are configured to form a direct communication network, such as a mesh network, in which the light fixtures communicate with one another by way of the direct communication technique. For instance, a first light fixture located near the external device may receive an instruction directly from the external device and may pass that instruction to other light fixtures near the first light fixture. Through communications among light fixtures, the instruction may be provided to each light fixture to which the instruction applies, and each of such light fixtures may comply with the instruction.

In one example, if an external device instructs a nearby light fixture in a house to turn off all light fixtures in the house, the nearby light fixture communicates that instruction to other light fixtures within its communication range via direct communication, and such other light fixtures communicate the instruction to light fixtures within their communication ranges, and so on until all light fixtures in the house have received the instruction. Each light fixture in the house then turns off its respective light in compliance with the instruction.

Implementations described herein enable a smart lighting system to be established with or without a communication network requiring hardware other than the light fixtures themselves. Thus, an initial smart lighting system may be established through installation of a set of light fixtures and through the pairing of such light fixtures with an external device, such as a smartphone, which may already be in a user's possession. At that time or a later time, if desirable, the user can obtain and install a hub or establish some other network for the light fixtures in addition to the direct communication network. At such later time, the direct communication network may then be used in conjunction with the other network as described herein. The light fixtures may be configured to receive instructions through the direct communication network as well as though the other network, such as a network facilitated by a hub. Although this disclosure refers repeatedly to the use of a hub to facilitate a hub-based network as the other network, various types of networks may be used in conjunction with the direct communication network.

FIG. 1 is a diagram of a control system 100 for controlling one or more light fixtures 110 via dual networks, according to some implementations. In some implementations, the control system 100 is a smart lighting system or is otherwise configured to control a set of light fixtures 110 that are part of the smart lighting system. The smart lighting system may include networked light fixtures 110 able to wirelessly receive instructions and to change their configurations. The light fixtures 110 of the smart lighting system, and thus of the control system 100 for the smart lighting system, may share a common premises, for instance, or may be managed by a common person or organization.

In some implementations, the control system 100 is configured to control one or more light fixtures 110 associated with the control system 100 by determining one or more instructions for such light fixtures 110 and providing such instructions to the light fixtures 110 over one or more networks such that the light fixtures 110 can comply with the instructions. Instructions can take various forms. For instance, an instruction may dictate a change in intensity of light emitted or a change in color temperature of the light emitted, the instruction may dictate characteristics of the light based on time or based on a detected condition, the instruction may dictate a shut-on or shutoff time, or the instruction may dictate various other parameters associated with the light fixture 110. In another example, a light fixture 110 is pre-programmed with lighting profiles stored on the light fixture 110, and an instruction can activate one or more of such lighting profiles or deactivate one or more of such lighting profiles, or the instruction can dictate that a lighting profile is dependent on a time of day or another factor. For instance, a lighting profile may define a set of behaviors for the light fixture, such as timing for turning light emission on or off or other automated activities.

In some implementations, the dual networks of the control system 100 include a first network 180, such as a hub-based network as shown via solid arrows in FIG. 1, and a direct communication network 190 facilitated by a direct communication (e.g., peer-to-peer) technique, such as Bluetooth or Near-Field Communication, as shown via dashed arrows. In some implementations, the direct communication technique is a form of communication directly from an external device 160 to a light fixture or directly from one light fixture to another, without routing through a hub or router. Thus, in some implementations, the direct communication network 190, which may be configured as a mesh network, delivers instructions directly from an external device 160 to a light fixture 110 or directly from one light fixture 110 to another without use of a hub 120 while, in the first network 180, instructions are routed to light fixtures 110 through a hub 120 or some other component (e.g., a router 130) rather than coming directly from the external device 160 or from another light fixture 110. The directions of arrows in FIG. 1 illustrate an example of a communications flow and do not limit the various implementations described herein.

As shown in FIG. 1, the control system 100 includes a set of light fixtures 110, each of which may be configured to emit light. Each light fixture 110 may be in communication with a hub 120. The hub 120 may be connected to a router 130, which may be connected to a modem 140, which may be connected to the internet, which may be connected to a cloud 150. In some implementations, the router 130 and the modem 140 are integrated together in a gateway device. The hub 120 and the light fixtures 110 may communicate over a wireless network, such as ZigBee, for instance. However, in some implementations, the light fixtures 110 connect directly to the router 130, and the hub 120 need not be included.

Each light fixture 110 may include one or more communication devices. More specifically, the light fixture 110 may include a first communication device 112 configured to communicate over the first network 180; for instance, the first communication device 112 may be a hub-communication device, such as a ZigBee device, for communicating with the hub 120 or may be a Wireless Fidelity (WiFi) card for communicating with the router 130. The light fixture 110 may further include a second communication device, such as a direct communication device 114, which can be a Bluetooth device (e.g., Bluetooth Low Energy (BLE)), an NFC device, or another peer-to-peer communication device, for communicating directly with an external device 160 or directly with other light fixtures 110. The light fixture 110 may utilize the first communication device 112 to receive instructions from the hub 120, or from the router in some implementations, and the light fixture 110 may utilize the direct communication device 114 to receive instructions directly from an external device 160 or directly from one or more other light fixtures 110, to deliver instructions directly to one or more other light fixtures 110, or to communicate status information with the external device 160, the hub 120, or other light fixtures 110.

In some implementations, a light fixture 110 includes a processing device 116, such as a microprocessor, configured to execute program code to implement the operations described herein. For instance, the processing device 116 is configured to receive instructions for operating the light fixture 110 over the first network 180 or the direct communication network 190, and the processing device 116 is configured to modify settings of the light fixture 110 (e.g., by turning light emission on or off) as needed to execute those instructions.

The hub 120 may be a smart lighting hub configured to communicate with one or more light fixtures 110 associated with the control system 100. For instance, the hub 120 is configured to communicate with each light fixture 110 associated with the control system 100. In some implementations, to communicate with a light fixture 110, the hub 120 utilizes the same communication technology as does the first communication device 112 of the light fixture 110. For instance, if the first communication device 112 of the light fixture 110 utilizes ZigBee, then the hub 120 utilizes ZigBee to communicate with the light fixture 110 via its first communication device 112. Further, in some implementations, the hub 120 is configured to communicate directly with the light fixture 110, but alternatively, communications from the hub 120 may be routed through one or more devices on the way to the light fixture 110. Various implementations are within the scope of this disclosure.

In some implementations, if no hub 120 is being used, the light fixtures 110 may be configured to communicate with the router 130. In that case, rather than a hub-communication device, each light fixture may include a WiFi device or other communication device configured to communicate with the router 130. It will be understood that, in that case, instructions described herein as being transmitted from the hub 120 to a light fixture 110 may instead by transmitted from the router 130 to the light fixture 110.

In some implementations, the direct communication device 114 has a limited range, such that the light fixture 110 may be unable to communicate by way of the direct communication device 114 with every other light fixture 110 that is part of a common smart lighting system. The range of the direct communication device 114 may be based on various factors such as, for instance, the specific communication technique (e.g., Bluetooth or NFC) used by the direct communication device 114 and the medium over which data is transmitted (e.g., including objects through which a transmission must pass). The light fixture 110 may be configured to receive an instruction from an external device 160 by way of the direct communication device 114, when the external device 160 is within a range of the light fixture 110 but may be unable to receive such instructions directly from the external device 160 when outside of that range.

The external device 160 may be a computing device configured to generate an instruction for one or more light fixtures 110 and to transmit that instruction to the cloud 150 or to a nearby light fixture 110. For instance, the external device 160 may be a smartphone, a control panel, a wall mounted controller that could look like a light switch, or an embedded device. In some implementations, the external device 160 includes a processing unit and a memory, where the processing unit is configured to execute instructions stored in a computer-readable medium (e.g., the memory), such as a non-transitory computer-readable medium, to perform the operations described herein. For instance, such instructions include instructions implementing the control application 170 described herein.

In some implementations, the external device 160 includes a first communication device and a direct communication device. The first communication device may enable communication with the cloud 150; for instance, the first communication device may be a WiFi device or a mobile communication device (e.g., Long-Term Evolution (LTE)). The first communication device need not utilize the same communication technique as the first communication device 112 (e.g., the hub-communication device) of the light fixtures 110. For instance, a hub-communication device of the light fixtures 110 may be a ZigBee device, and the first communication device of the external device 160 may be a mobile communication device by which the external device 160 accesses the internet. The direct communication device may provide direct communication to light fixtures 110 within a range of the direct communication device; for instance, the direct communication device may be a Bluetooth device or an NFC device. In some implementations, the direct communication device of the external device 160 uses the same communication technology as do the direct communication devices 114 of the light fixtures 110 so as to enable direct communication between the external device 160 and the light fixtures 110.

In some implementations, the control system 100 includes a control application 170, which may be configured to run remotely from the light fixtures 110. For instance, the control application 170 is executable by the external device 160. The control application 170 enables the external device 160 to provide instructions to one or more light fixtures 110 that are also connected to a hub-based network (i.e., connected to the hub 120). For instance, the control application 170 may provide an interface useable by a user to construct or select an instruction. Such instruction may apply to one or more light fixtures 110, in that the instruction asks such one or more light fixtures 110 to change their state. The control application 170 may be further configured to select an operational mode utilized by the external device 160 when delivering the instruction to the light fixtures 110 to which the instruction applies, and the control application 170 may be configured to initiate transmission using the selected operational mode. The available operational modes may be, for instance, direct mode or indirect mode, or both.

In indirect mode, the external device 160 delivers the instruction using the first network 180. To this end, in some implementations, the external device 160 utilizes its first communication device to transmit the instruction to the hub 120, such as over the internet to the cloud 150, which delivers the instruction to the hub 120 by way of the modem 140 and the router 130. After receiving the instruction, the hub 120 delivers the instruction to the light fixtures 110 to which the instruction applies. In the example shown in FIG. 1, the control system 100 causes the instruction to be transmitted from the external device 160 to the cloud 150. Alternatively, however, if both the external device 160 and the hub 120 are connected to the same router 130 and thus share a local area network, the external device 160 may transmit the instruction to the router 130, which may transmit the instruction to the hub 120 without routing through the cloud 150. For another example, if the external device 160 is directly connected to the hub 120 (e.g., by way of ZigBee), the control system 100 may cause the external device 160 to transmit the instruction directly to the hub 120 without routing through the cloud 150 or the router 130, and the hub 120 may deliver the instruction to the light fixtures 110 to which the instruction applies. Various implementation are possible and are within the scope of this disclosure.

If the indirect mode is used, the control application 170 may cause the external device 160 transmit the instruction through the hub 120. Responsive to this request, the external device 160 may utilize its first communication device to transmit the instruction to the cloud 150. If the external device 160 is connected to the same router 130 as is the hub 120, transmission to the cloud 150 may require relay through the same router 130 and modem 140 used by the hub 120. Alternatively, however, the transmission may pass through a different router on the way to the hub 120, or if the external device 160 is utilizing a mobile communication device, the transmission may pass through a tower of a mobile network. The cloud 150 may forward the instruction to the modem 140, which may forward the instruction to the router 130, which may forward the instruction to the hub 120, which may forward the instruction to the light fixtures 110 to which the instruction applies.

In the direct mode, the external device 160 delivers the instruction using the direct communication network 190. To this end, in some implementations, the external device 160 utilizes its direct communication device to transmit the instruction directly to one or more light fixtures 110 reachable by way of the direct communication device (e.g., within the range of the direct communication device). As described further below, the instruction may then be propagated throughout the direct communication network 190 formed by the light fixtures 110.

If the direct mode is used, the control application 170 may request that the external device 160 transmit the instruction directly to one or more light fixtures 110 including, for instance, each light fixture 110 with which the external device 160 can directly communicate using the direct communication device. To this end, for instance, the external device 160 is paired (e.g., via Bluetooth) via the direct communication device with a set of light fixtures 110 associated with the control system 100 and can thus detect a subset of such light fixtures 110 to which the external device 160 is currently connected. As such, the external device 160 transmits the instruction to one or more of such light fixtures 110 detected as being within range. Alternatively, for instance, the external device 160 sends out a broadcast (e.g., via NFC) via the direct communication device such that light fixtures 110 within a range of the direct communication device and using the same communication technology can receive the instruction.

In some implementations, when a first light fixture 110 receives the instruction, the first light fixture 110 determines whether the instruction applies to the first light fixture 110. For instance, an instruction may identify one or more individual light fixtures 110 or a set of light fixtures 110 to which the instruction applies. Specifically, in one example, each light fixture 110 stores its location, such as the room in which the light fixture 110 is installed, as defined by a user during setup of the light fixture 110 as part of the control system 100. An instruction can indicate that it applies to light fixtures 110 in a given room, such as a foyer, and upon receiving the instruction, the light fixture 110 determines that the instruction applies to the given room and compares the given room to the name of the stored location in which the light fixture is installed. If the given room matches the stored location, then the light fixture 110 determines that the instruction applies to itself. In another example, the instruction identifies a light fixture by a unique identifier, such as a serial number, a Media Access Control (MAC) address, Internet Protocol (IP) address, or a name assigned by a user. Upon receiving the instruction, the light fixture 110 compares the unique identifier in the instruction with its own stored unique identifier to determine whether the instruction applies to the light fixture 110.

If the instruction applies to the first light fixture 110, the first light fixture 110 follows the instruction. For instance, if the instruction is to turn off the lights in the foyer, then the first light fixture 110 determines whether the first light fixture 110 is in the foyer (e.g., based on internal data describing the location of the first light fixture 110), and if so, the first light fixture 110 turns off (i.e., stops emitting light). In some implementations, regardless of whether the instruction is applicable to the first light fixture 110, the first light fixture transmits the instruction to other light fixtures 110 with which the first light fixture 110 can communicate via its direct communication device 114. Like the external device 160, a light fixture 110 may be paired with other light fixtures 110 associated with the control system 100 and may thus detect which of such light fixtures 110 are within range, so as to transmit the instruction to the other light fixtures 110 within range of its direct communication device 114. If the first light fixture receives the instruction multiple times (e.g., from the external device 160 and from another light fixture 110, or from two or more light fixtures 110), the first light fixture 110 need not determine whether to perform the instruction and need not transmit the instruction each time the instruction is received but, rather, may perform these tasks only once in response to the instruction.

A second light fixture 110 may receive the instruction from the first light fixture 110. Like the first light fixture 110, the second light fixture 110 may determine whether the instruction applies to it and, if so, may comply with the instruction. The second light fixture 110 may forward the instruction to one or more other light fixtures 110. The second light fixture 110 may be configured to identify the first light fixture 110 as sender of the instruction. For instance, the first light fixture 110 sends an identifier of itself along with the instruction, or the second light fixture 110 accesses metadata associated with the transmission of the instruction and recognizes that metadata to include a signature, MAC address, IP address, or other identifier associated with the first light fixture 110. As such, when transmitting the instruction to one or more other light fixtures 110, the second light fixture 110 may avoid resending the instruction back to the first light fixture 110. In some implementations, eventually, all light fixtures 110 reachable from the external device 160 over the direct communication network 190 formed by the light fixtures 110 receive the instruction and, if applicable, comply with the instruction.

In some implementations, the control system 100 determines an operational mode for each instruction on an individual basis. Additionally or alternatively, however, the control system 100 determines an operational mode, and that operational mode remains in effect while a certain condition is met (e.g., twenty-four hours pass or the external device 160 is located in a given area). More specifically, in some implementations, the control application 170 of the control system 100 on the external device 160 makes this determination. The control system 100 may base its selection of an operational mode on availability or priority, or a combination of both. For instance, the control system 100 may consider only operational modes that are deemed available when determining how to deliver an instruction. Thus, if the direct communication device is not currently available or if no light fixture 110 is reachable via the direct communication device, then the control system 100 need not consider the direct mode for delivery of an instruction. In contrast, if the external device 160 does not currently have internet access and, thus, cannot reach the hub 120 through the cloud 150 or otherwise, then the indirect mode may be deemed unavailable and need not be considered an option for delivery of the instruction. From among available operational modes, the control system 100 may select the operational mode with the highest priority in some implementations.

Prioritization may be set by default or may be set by a user. In some implementations, the first network 180 via the hub 120 is more reliable for reaching every light fixture 110 of the control system 100 than is the direct communication network 190 because the direct communication network 190 relies on the limited ranges of the direct communication device of the external device 160 and the direct communication devices 114 of the light fixtures 110. Thus, in some examples, delivery via the indirect mode (e.g., via the hub 120) is prioritized over the direct mode due to an assumption that the hub 120 is able to reach all light fixtures 110, and in contrast, it may not be guaranteed that all light fixtures 110 to which an instruction is applicable can be reached using the direct mode.

Regardless of which operational mode is used, the instruction may be same, or the control application 170 may modify the instruction as needed based on the operational mode. For instance, if using the direct mode, the control application 170 may modify the instruction to indicate that each light fixture 110 should pass the instruction along to other light fixtures 110 if possible. However, in some implementations, a light fixture 110 is already programmed to pass instructions to other light fixtures 110, if possible, when an instruction is received via the direct communication device 114.

In some implementations, the control system 100 utilizes only one operational mode for a given instruction, or alternatively, the control system 100 utilizes a combination of operational modes for a given instruction. In one example, the control system 100 uses the direct mode to control the light fixtures 110 for fast execution of an instruction and additionally utilizes the indirect mode to communicate with hub 120 to control the light fixtures 110. This redundant delivery of the instruction can ensure that all light fixtures 110 to which the instruction is applicable are reached and that the instruction is applied in an efficient manner. In another example, the control system 100 uses the direct mode to control the light fixtures 110 and additionally utilizes the indirect mode to communicate with the hub 120 to inform the hub 120 that the instruction was sent and was applicable to certain light fixtures 110 such that the status of those certain light fixtures 110 is potentially changed. This redundant delivery can ensure that the hub 120 remains up to date as to the status of the light fixtures 110.

In some cases, a light fixture 110 may receive conflicting instructions, such as a first instruction received from an external device 160 or from a second light fixture 110 over the mesh network and a second instruction received from the hub 120 over the hub-based network, or from some other first network 180, within a short timeframe (e.g., one second). To address such a case, the processing device 116 of the light fixture 110 may be configured to apply a contention rule to handle contentions, resulting in one or both instructions being followed or one or both instructions being ignored. For instance, in accordance with the contention rule, in the case of a conflict between a first instruction and a second instruction, the light fixture 110 may comply with the instruction received more recently, or one of such networks may be prioritized over the other. In some cases, the contents of conflicting instructions may be relevant to the contention rule. For instance, an instruction to dim to a specific level may be prioritized over an instruction to dim by one increment. In the case of toggle instructions, the contention rule may indicate that only one toggle of a certain setting (e.g., toggling light emission on and off) may be applied within a given timeframe, such as one per second, such that the first toggle instruction for a setting is applied and any other toggle instruction received for the same setting is ignored until the given timeframe passes since the first toggle instruction was received. However, various other techniques may be used to handle contentions.

In some implementations, a user of the control application 170 need not decide how a particular instruction is routed to the light fixtures; rather, the control application 170 can determine an operational mode based on internal data, such as data describing prioritization, and based on a determination of which networks (e.g., the direct communication network 190 or the hub-based network) are available to the external device 160. If the direct communication network 190 is not currently active (e.g., the direct communication network 190 is currently down or has not yet been established), the control application 170 may detect the lack of a direct communication network 190 and may utilize the hub 120 for routing instructions. Analogously, if the hub 120 is not currently available (e.g., no hub 120 is installed or the hub 120 is unreachable due to a connection being down), the control application 170 may detect the unavailability of the hub 120 and may utilize the direct mode of delivery. Thus, the user need not indicate to the control application 170 which networks are available. Additionally or alternatively, the user may expressly select which operational mode to use (i.e., direct or indirect), and in that case, the control application 170 may receive that selection and prioritize the selected operational mode.

Figure 2:
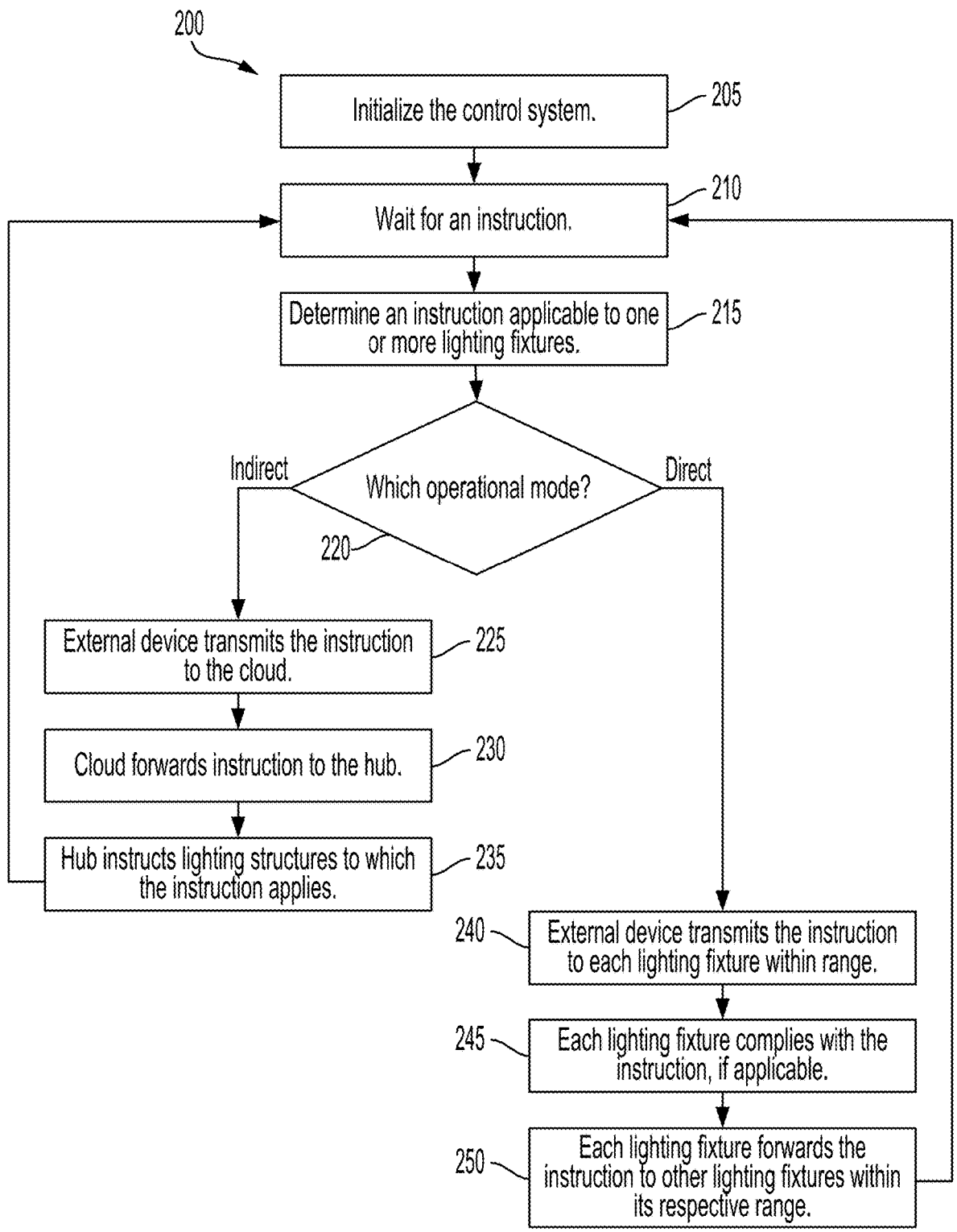
FIG. 2 is a flow diagram of a method of controlling a light fixture, according to some implementations.

FIG. 2 is a flow diagram of a method 200 for controlling a light fixture 110, according to some implementations. The method 200 depicted in FIG. 2 may be implemented in software (e.g., firmware) executed by one or more processing units of the external device 160 or some other device, implemented in hardware, or implemented in a combination of software and hardware. The method 200 presented in FIG. 2 and described below is illustrative and non-limiting. In certain implementations, operations may be added or removed, the operations described below may be performed in a different order, or some operations may also be performed in parallel. In some implementations, this method 200 or similar is performed in whole or in part by the control system 100.

At block 205 of the method 200, the control system 100 is initialized. Initializing the control system 100 can include, for instance, establishing a prioritization of operational modes, specifically, for instance, a prioritization between the direct mode and the indirect mode. For instance, the prioritization may be set by default, or the prioritization may be received at the external device 160 upon entry by a user. It will be understood that various mechanisms exist to establish the prioritization.

At block 210, the control system 100 awaits an instruction for operation the light fixtures 110 associated with the control system 100. These light fixtures 110 may be those included in a single smart lighting system, for example.

At block 215 of the method 200, the control system 100 determines an instruction at the external device 160. For example, the instruction is entered by a user utilizing the control application 170 running on the external device 160. For another example, the control system 100 accesses a set of existing instructions that are part of an automation; for example, such as set of existing instructions might adjust the brightness or color temperature of certain light fixtures 110 based on the time of day. The control system 100 may determine that criteria associated with an instruction in the set are met such that the instruction should be executed. Regardless of how the instruction is determined, the instruction may be applicable to one or more light fixtures associated with the control system 100.

At decision block 220, the control system 100 evaluates the first network 180 and the direct communication network 190 and, as a result, selects an operational mode (e.g., direct or indirect) for transmitting the instruction to the light fixtures 110. In some implementations, making the evaluation involves considering availability or priority, or both. For instance, the control application 170 detects which communication devices are available including, for instance, the first communication device and the direct communication device of the external device 160. If the first communication device is present and available for communicating over the first network 180, then the control application 170 can deem the indirect mode, which requires communication via the first communication device in some implementations, to be available. If the direct communication device is present, available, and can reach at least one light fixture 110, then the control application 170 deems the direct mode to be available. If more than a single operational mode is available, the control application 170 may select for use the available operational mode with the highest priority according to the established prioritization.

If the determined operational mode is the indirect mode, then at block 225, the control application 170 transmits the instruction to the cloud 150 either directly or indirectly via the external device 160. For example, the external device 160 may transmit the instruction to the cloud 150 over the internet, such as by way of WiFi or a mobile connection. At block 230, the cloud 150 forwards the instruction to the hub 120, for instance, by way of the modem 140 and the router 130. At block 235, the hub 120 instructs the light fixtures 110 to which the instruction applies to comply with the instruction (e.g., by transmitting the instruction to such light fixtures 110).

However, if the selected operational mode is the direct mode, then at block 240, the control application 170, via the external device 160, transmits the instruction to one or more light fixtures 110 in range of the direct communication device of the external device 160. At block 245, if the instruction applies to a light fixture 110 receiving the instruction, then that light fixture 110 complies with the instruction. At block 250, the light fixture 110 forwards the instruction to each light fixture 110 within the range of its respective direct communication device 114. In some implementations, block 245 and block 250 may be performed once by each light fixture 110 receiving the instruction. As such, each light fixture 110 reachable through a path of light fixtures 110 utilizing their direct communication devices 114 may comply with the instruction if applicable.

As shown in FIG. 2, after delivery of the instruction by either the direct mode or the indirect mode, the control system 100 proceeds to wait for further instructions, as at block 210. For each instruction received, an implementation of the control system 100 proceeds to block 215 and continues the method 200 as described above.

Thus, as described herein, some implementations of the control system 100 provide a technique for controlling light fixtures 110 in addition or alternatively to control via a hub 120 or other indirect means. More specifically, an implementation described herein may utilize a direct communication network 190, such as a Bluetooth network, to propagate an instruction among the light fixtures 110 to potentially deliver the instruction to light fixtures 110 to which the instruction applies. This direct communication network 190 may be utilized when communication through a hub 120 is unavailable or when the direct communication network 190 is given priority over the hub 120.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, or additions to the present subject matter as would be readily apparent to one of ordinary skill in the art.

What is claimed is:

1. A control system comprising:
   a light fixture comprising:
   a first communication device configured to communicate over a first network using a first communication technique; and
   a second communication device configured to communicate over a second network different from the first network using a second communication technique different from the first communication technique; and
   a control application configured to run on an external device configured to communicate over the first network and the second network, wherein the control application is further configured to:
   determine a lighting instruction;

evaluate the first network and the second network to select the first network over the second network for transmitting the lighting instruction to the light fixture; and transmit the lighting instruction to the light fixture via the first network.

2. The control system of claim 1, wherein the control application is further configured to:

determine a second lighting instruction;

select the second network over the first network for transmitting the second lighting instruction to the light fixture; and transmit the second lighting instruction to the light fixture via the second network.

3. The control system of claim 2, wherein selecting the second network over the first network comprises determining that the first network is unavailable.

4. The control system of claim 2, wherein selecting the second network over the first network comprises:

detecting that both the first network and the second network are available; and determining that the second network has a higher priority than the first network.

5. The control system of claim 1, wherein the control application is further configured to transmit the lighting instruction to the light fixture via the second network in addition to the first network.

6. The control system of claim 1, wherein the first network is a peer-to-peer network, wherein the external device communicates directly with the light fixture to transmit the lighting instruction.

7. The control system of claim 6, wherein the light fixture is configured to use the first communication device to transmit the lighting instruction to a second light fixture.

8. The control system of claim 6, wherein the light fixture is further configured to:

receive the lighting instruction via the first network;

receive a conflicting instruction via the second network, wherein the conflicting instruction conflicts with the lighting instruction; and apply a contention rule to determine whether to comply with the lighting instruction or the conflicting instruction.

9. The control system of claim 6, wherein the second network comprises a smart lighting hub configured to communicate with a set of light fixtures.

10. The control system of claim 9, wherein the control application is configured to update the smart lighting hub over the second network to indicate a changed status of the light fixture based on the lighting instruction.

11. A computer-program product comprising a computer-readable storage medium having program instructions embodied thereon, the program instructions executable by a processor to cause the processor to perform a method comprising:

determining a first lighting instruction;

detecting a first communication device for transmitting the first lighting instruction to a light fixture over a first network;

detecting a peer-to-peer communication device, different from the first communication device, for transmitting the first lighting instruction to the light fixture over a peer-to-peer network;

selecting the first network over the peer-to-peer network for the first lighting instruction;

using the first communication device to transmit the first lighting instruction to the light fixture over the first network to control the light fixture;

determining a second lighting instruction;

selecting the peer-to-peer network over the first network for the second lighting instruction; and using the peer-to-peer communication device to transmit the second lighting instruction to the light fixture over the peer-to-peer network to control the light fixture.

12. The computer-program product of claim 11, wherein selecting the first network over the peer-to-peer network for the first lighting instruction comprises determining that the first network has priority over the peer-to-peer network.

13. The computer-program product of claim 12, further comprising receiving an indication from a user to prioritize the first network over the peer-to-peer network.

14. The computer-program product of claim 11, wherein selecting the peer-to-peer network over the first network for the second lighting instruction comprises detecting that the first network is unavailable.

15. The computer-program product of claim 11, further comprising using the first communication device to transmit the second lighting instruction to a second light fixture over the first network.

16. The computer-program product of claim 11, wherein the first network comprises a smart lighting hub in communication with the light fixture, and the method further comprising using the first communication device to transmit the second lighting instruction to the smart lighting hub to update a status of the light fixture at the smart lighting hub.

17. A light fixture comprising:

a first communication device configured to communicate with a smart lighting hub;

a peer-to-peer communication device different from the first communication device and configured to communicate directly with each of an external device and a second light fixture; and a processing device configured to:

receive a first lighting instruction for controlling the light fixture via the first communication device;

modify a setting of the light fixture in accordance with the first lighting instruction;

receive a second lighting instruction for controlling the light fixture from the external device via the peer-to-peer communication device; and modify the setting of the light fixture in accordance with the second lighting instruction.

18. The light fixture of claim 17, wherein the peer-to-peer communication device is further configured to transmit the second lighting instruction to the second light fixture.

19. The light fixture of claim 17, wherein the processing device is further configured to:

receive a third lighting instruction for controlling the light fixture;

determine that the third lighting instruction is in conflict with the first lighting instruction; and ignore the third lighting instruction based on the conflict with the first lighting instruction.

20. The light fixture of claim 17, wherein the peer-to-peer communication device is at least one of Bluetooth or Near-Field Communication.

* * * * *